United States Patent [19]

Miyazaki et al.

[11] 3,963,877
[45] June 15, 1976

[54] SYNCHRONIZING SIGNAL TRANSMISSION SYSTEM

[75] Inventors: Ken Miyazaki, Tokyo; Kenji Nakajima, Yokohama, both of Japan

[73] Assignee: Victor Company of Japan, Limited, Japan

[22] Filed: Oct. 7, 1974

[21] Appl. No.: 512,608

[30] Foreign Application Priority Data

Oct. 11, 1973 Japan.............................. 48-113203

[52] U.S. Cl. ...................... 178/69.5 TV; 178/7.3 S; 179/15 BA
[51] Int. Cl.² .......................................... H04L 7/00
[58] Field of Search............ 178/69.5 TV, 69.5 DC, 178/7.3 S, 7.5 S; 179/15 BA; 340/172

[56] References Cited
UNITED STATES PATENTS

| | | | |
|---|---|---|---|
| 3,261,919 | 7/1966 | Aaron et al. .................... | 179/15 BA |
| 3,261,920 | 7/1966 | Aaron............................. | 179/15 BA |
| 3,420,951 | 1/1969 | Günther ....................... | 178/69.5 TV |

*Primary Examiner*—Malcolm A. Morrison
*Assistant Examiner*—Errol A. Krass
*Attorney, Agent, or Firm*—Holman & Stern

[57] ABSTRACT

A synchronizing signal transmission system comprises: a circuit for mixing a horizontal synchronizing signal and a vertical synchronizing signal from a synchronizing signal generator and producing a mixed synchronizing signal having a first voltage-level range wherein horizontal synchronizing pulses exist only in a period corresponding to the pulse width of the vertical synchronizing signal, a second voltage-level range wherein the horizontal synchronizing pulses exist in all periods, and a third voltage-level range wherein the horizontal synchronizing pulses do not exist in a period corresponding to the pulse width of the vertical synchronizing signal and exist in other periods; a transmission line for transmitting the mixed synchronizing signal; and a circuit for separating the mixed synchronizing signal thus transmitted in accordance with the first, seconds, and third voltage-level ranges, leading out a signal corresponding to the second voltage-level range thus separated as a horizontal synchronizing signal, and, at the same time, processing signals corresponding respectively to the first through third voltage-level ranges thereby to obtain and lead out a vertical synchronizing signal.

4 Claims, 4 Drawing Figures

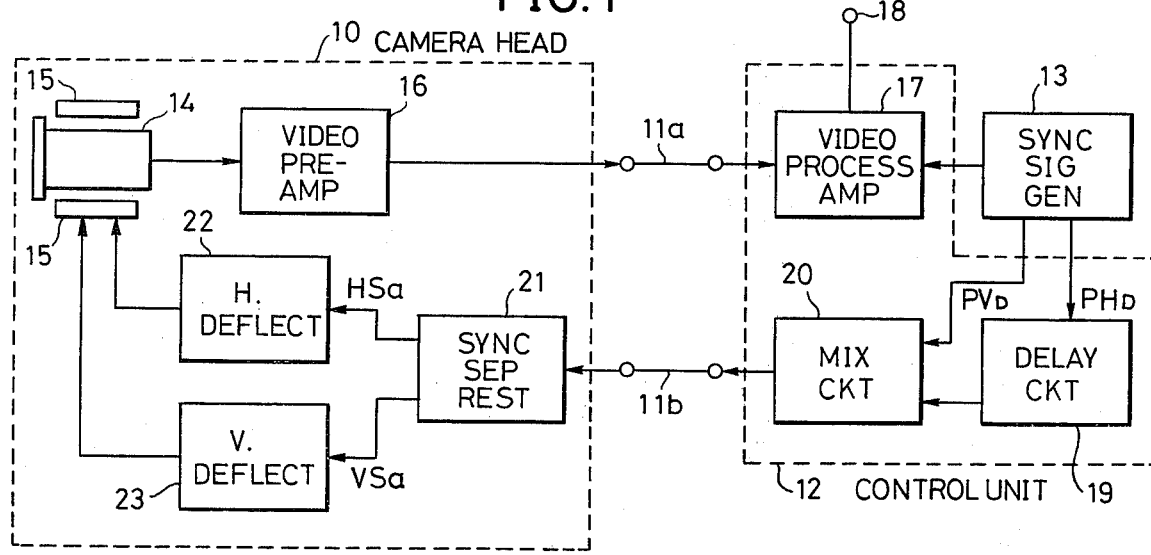
FIG. 1
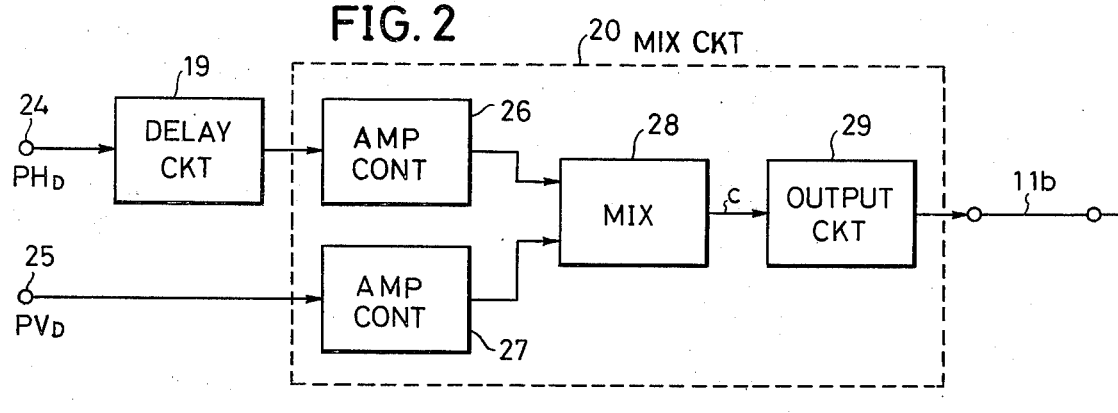
FIG. 2
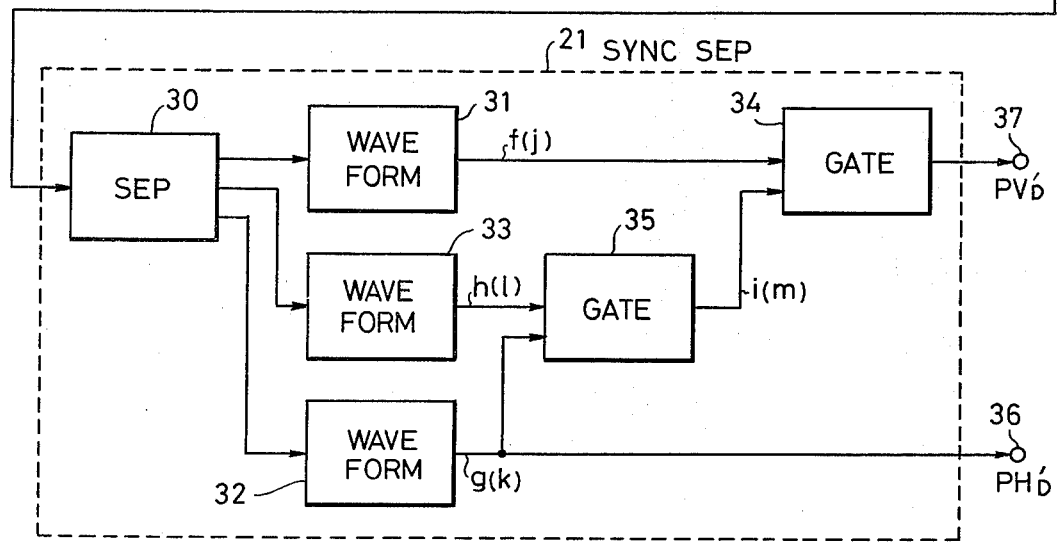

3,963,877

SYNCHRONIZING SIGNAL TRANSMISSION SYSTEM

BACKGROUND OF THE INVENTION

The present invention relates generally to systems for transmitting synchronizing signals. More particularly, the invention relates to a synchronizing signal transmission system operating to mix a horizontal synchronizing signal and a vertical synchronizing signal for television signals, to transmit the synchronizing signal thus mixed with a single signal transmission line, and separating and restoring this mixed signal as a horizontal synchronizing signal and a vertical synchronizing signal.

Heretofore, systems as exemplified by the following examples have been known for transmitting a horizontal synchronizing signal and a vertical synchronizing signal by means of a single signal transmission line such as a coaxial cable and separating and reproducing the two synchronizing signals on the transmission receiving end.

1. A system wherein a composite synchronizing signal for standard television broadcasting is transmitted and is separated at the transmission receiving end as a horizontal synchronizing signal and a vertical synchronizing signal.

2. A system wherein a horizontal synchronizing signal and a vertical synchronizing signal are mixed directly as they are to produce a mixed synchronizing signal, which is transmitted to the receiving side, where it is differentiated and integrated thereby to separate and restore the same as a horizontal synchronizing signal and a vertical synchronizing signal.

The prior art system (1) has been accompanied by the difficulty of the need for using a complicated circuit for generating the composite synchronizing signal. Furthermore, in transmitting a synchronizing signal between a control unit and a television camera head, it is necessary to adjust the phase of the horizontal synchronizing signal in accordance with the length of the camera cable for connecting the control unit and the camera head. By the above mentioned known system, however, the phase adjustment of the horizontal synchronizing signal thereof becomes extremely complicated and is difficult.

By the latter known system (2), the horizontal synchronizing signal on the transmission end is transmitted by mere superimposition and mixing thereof as it is with the vertical synchronizing signal, and on the receiving end, the mixed synchronizing signal thus transmitted is differentiated to separate and restore the horizontal synchronizing signal and integrated to separate and restore the vertical synchronizing signal. Then, in order to cause the video signal to undergo interlaced scanning, in general, the phase relationship of the horizontal and vertical synchronizing signals differ in the even-number fields and the odd-number fields.

More specifically, in an even-number field, the rising part and falling part of the vertical synchronizing signal are between adjacent horizontal synchronizing signals, while in an odd-number field, the rising part and falling part of the vertical synchronizing signal are respectively coincident with those of the horizontal synchronizing signal. Then, since the vertical synchronizing signal is obtained by integrating the mixed synchronizing signal, the rising time of the separated and restored vertical synchronizing signal differs with every field, whereby it becomes impossible to accomplish a fully satisfactory interlaced scanning. Consequently, the vertical resolution decreases, and the picture quality deteriorates.

SUMMARY OF THE INVENTION

Accordingly, it is a general object of the present invention to provide a novel and useful signal transmission system wherein the above described difficulties accompanying the prior art have been overcome.

A specific object of the invention is to provide a synchronizing signal transmission system capable of transmitting a horizontal synchronizing signal and a vertical synchronizing signal with an accurate phase relationship.

Another object of the invention is to provide a system wherein a horizontal synchronizing signal and a vertical synchronizing signal are so mixed that they are rendered into a mixed synchronizing signal having three different voltage-level ranges, and the mixed synchronizing signal thus formed is transmitted. By this feature of the system according to the invention, the mixed synchronizing signal thus transmitted is separated on the receiving side in accordance with the voltage-level ranges. For this reason, there is no separation of the vertical synchronizing signal by integration as in known systems, and, accordingly, the phase relationship of the horizontal and vertical synchronizing signals can be maintained accurately as desired.

Still another object of the invention is to provide a system in which a horizontal synchronizing signal and a vertical synchronizing signal are so mixed as to be rendered into a mixed synchronizing signal having a voltage-level range wherein the horizontal synchronizing signal exists only during a period corresponding to the vertical synchronizing signal, a voltage-level range wherein the horizontal synchronizing signal exists during all periods, and a voltage-level range wherein the horizontal synchronizing signal does not exist in a period corresponding to the vertical synchronizing signal but exists in other periods, and the resulting mixed signal is transmitted.

Other objects and further features of the invention will be apparent from the following detailed description when read in conjuction with the accompanying drawings.

BRIEF DESCRIPTION OF THE DRAWINGS

In the drawings:

FIG. 1 is a block diagram showing the essential organization of one embodiment of a synchronizing signal transmission system according to the present invention;

FIG. 2 is a block diagram in greater detail of an important part of the system illustrated in FIG. 1;

DETAILED DESCRIPTION

Figure 3:
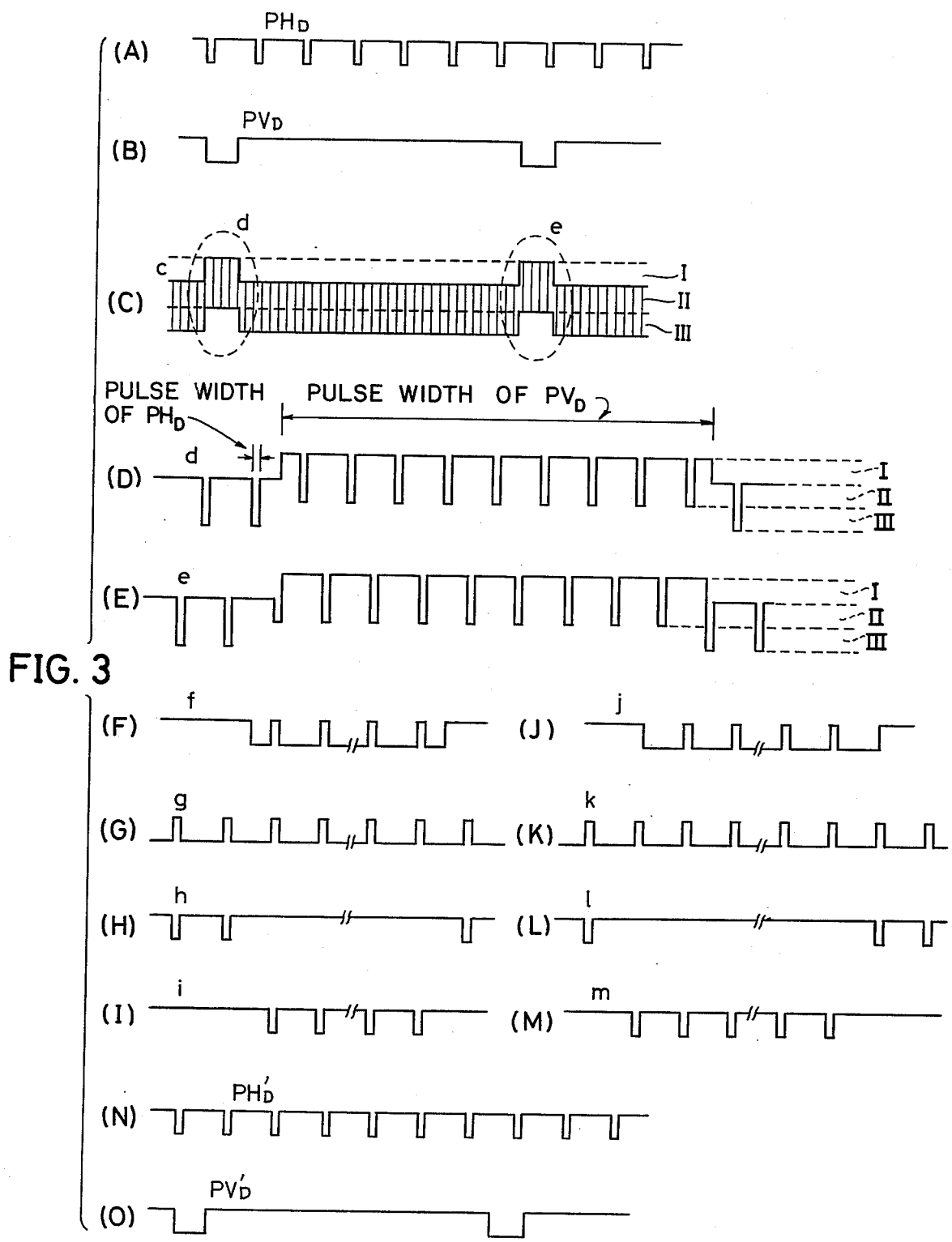
FIGS. 3(A) through 3(O) are waveform charts respectively indicating waveforms of signals at various parts of the system illustrated in FIG. 2 for a description of the operation thereof.

Referring first to FIG. 1 showing therein one embodiment of a synchronizing signal transmission system according to the present invention. A camera head 10 of a television camera is connected to a camera control unit 12 by coaxial cables 11a, 11b within a camera cable. The control unit 12 is supplied with synchronizing signals from a synchronizing signal generator 13.

The camera head 10 has a camera tube 14 (e.g., a vidicon) for carrying out picture taking and converting the light from the object into electrical signals. This camera tube 14 thus produces, as electrical output signals, video signals which are supplied to a video preamplifier 16 and are here amplified. The video signals thus amplified are then supplied by way of a coaxial cable (transmission line) 11a to a video process amplifier 17 within the control unit 12. On one hand, synchronizing signals to be inserted into the video signals are supplied from the synchronizing signal generator 13 to the video process amplifier 17, and the above mentioned video signals are here subjected to processing for an addition of the synchronizing signals. The video signals thus processed are sent out through a video output terminal 18.

On one hand a horizontal synchronizing signal $PH_D$ from the synchronizing signal generator 13 is supplied to a delay circuit 19 in the control unit 12, where the signal $PH_D$ is delayed by an amount in accordance with the amount of delay to which it is subjected by the coaxial cables 11a and 11b between the camera head 10 and the control unit 12 and is phase corrected, being thereafter supplied to a mixing circuit 20. The amount of delay of the delay circuit 19 is selected at a suitable value in accordance with the lengths of the cables 11a and 11b. Furthermore, a vertical synchronizing signal $PV_D$ from the synchronizing signal generator 13 is supplied directly to the mixing circuit 20.

The horizontal and vertical synchronizing signals $PH_D$ and $PV_D$ supplied to the mixing circuit 20 are respectively amplitude-controlled as described hereinafter and then mixed. A special mixed synchronizing signal of the output of this mixing circuit 20 is supplied through the coaxial cable (transmission line) 11b to a circuit 21 for separating and restoring synchronizing signals within the camera head 10 and is here separated and restored as horizontal and vertical synchronizing signals $PH'_D$ and $PV'_D$ in accordance with the voltage level thereof. The horizontal synchronizing signal $PH_D$ is supplied to a horizontal deflection circuit 22, while the vertical synchronizing signal $PV_D$ is supplied to a vertical deflection circuit 23. From these horizontal and vertical deflection circuits 22 and 23, currents of sawtooth waveform for horizontal and vertical deflection, respectively, are produced as output and fed respectively to a deflection yoke 15 of the picture tube 14 thereby to cause the electron beam of the picture tube 14 to carry out horizontal and vertical scannings.

The organization and operation of the above mentioned mixing circuit 20 and synchronizing signal separating and restoring circuit 21 will now be described in detailed with reference to FIGS. 2 and 3. A horizontal synchronizing signal $PH_D$ as indicated in FIG. 3(A) from the synchronizing signal generator 13 is applied to a terminal 24, delayed as described above by the delay circuit 19, and thereafter supplied to an amplitude-controlling circuit 26 within the mixing circuit 20. On the other hand, a vertical synchronizing signal $PV_D$ as indicated in FIG. 3(B) from the synchronizing signal generator 13 is applied to a terminal 25 and supplied to an amplitude-controlling circuit 27 within the mixing circuit 20. By the amplitude controlling circuit 26, the horizontal synchronizing signal $PH_D$ is amplitude controlled to have a greater amplitude than the vertical synchronizing signal $PV_D$, which is amplitude-controlled by the amplitude controlling circuit 27. The horizontal and vertical synchronizing signals thus amplitude controlled respectively by the amplitude-controlling circuit 26 and 27 are respectively fed to a mixer 28 and are here mixed.

In this connection it should be mentioned that, for the sake of simplicity of explanation, the various waveforms in FIG. 3 are all indicated with phase relationships of their states wherein there is no delay in the coaxial cables 11a and 11b of the camera cable and wherein there is no delay due to the delay circuit 19. In actual practice, the phase relationship of the horizontal and vertical synchronizing signals $PH_D$ and $PV_D$ from the synchronizing signal generator 13 is set with a lag with consideration of the delay resulting from the camera cable when the longest camera cable is used. Accordingly, when a short camera cable is used, a delay amount corresponding to the difference between the length of the longest cable and that short cable is imparted by the delay circuit 19.

The voltage-level waveform of the mixed synchronizing signal produced output from the mixer 28 is as indicated as c in FIG. 3(C), which is a superposition of an amplified signal of the waveform shown in FIG. 3(A) on the reversed polarity of the waveform shown in FIG. 3(B). This mixed synchronizing signal c has a high voltage-level range I corresponding to the pulse height of the vertical synchronizing signal, in which range horizontal synchronizing pulses exist only during a period corresponding to a pulse width of the vertical synchronizing signal, a medium voltage-level range II corresponding to the difference between the pulse height of the horizontal synchronizing signal and the pulse height of the vertical synchronizing signal, in which range the horizontal synchronizing pulses exist in all periods, and a low voltage-level range III corresponding to the pulse height of the vertical synchronizing signal, in which range the horizontal synchronizing pulses do not exist in a period corresponding to the pulse width of the vertical synchronizing signal and exist in other periods. That is, the amplitude controlling circuits 26 and 27 carry out amplitude control of the horizontal and vertical synchronizing signals in a manner such that the output signal of the mixer 28 becomes a mixed synchronizing signal c having voltage-level ranges I, II, and III as described above.

The mixed synchronizing signal comprises alternate synchronizing signals for even number fields and synchronizing signals for odd number fields in order to cause the video signals to undergo interlacing. Enlargements of the parts d and e enclosed by intermittent line in the mixed synchronizing signal c shown in FIG. 3 (C) are respectively shown in FIGS. 3(D) and 3(E). In the signal part d shown in FIG. 3(D), the two ends of the period corresponding to the vertical synchronizing pulse are at position at one half of the spacing of the horizontal synchronizing pulse, while in the signal part e shown in FIG. 3(E), the two ends of the period corresponding to the vertical synchronizing pulse coincide with the horizontal synchronizing pulses.

The mixed synchronizing signal c produced as output of the mixer 28 is sent out of the mixing circuit 20 through an output circuit 29 and is transmitted through the coaxial cable 11b to be supplied to a separating circuit 30 of the synchronizing signal separating and restoring circuit 21. The mixed synchronizing signal c thus transmitted to the separating circuit 30 undergoes separation in accordance with the above mentioned voltage-level ranges I, II, and III and is wave shaped by wave-shaping circuits 31, 32, and 33 and thereby rendered into signals $f$, $g$, and $h$ shown in FIGS. 3(F), 3(G), and 3(H) of the following characteristics. The signal $f$ is a signal which has a vertical synchronizing pulse, and in which a horizontal synchronizing pulses exist only in a period corresponding to the pulse width of the vertical synchronizing signal. The signal $g$ is a signal in which the horizontal synchronizing pulses exist throughout all periods. The signal $h$ is a signal in which the horizontal synchronizing pulses do not exist in the period corresponding to the pulse width of the vertical synchronizing signal and exist in other periods.

The ouput signal $f$ of the wave-shaping circuit 31 is fed to a first gate circuit 34. The output signal $g$ of the wave-shaping circuit 32 is sent out directly as it is to an output terminal 36 as a transmitted and restored horizontal synchronizing signal $PH'_D$ as indicated in FIG. 3(N) and, at the same time, is fed to a second gate circuit 35. The output signal $h$ of the wave-shaping circuit 33 is fed to the same gate circuit 35.

The signal $g$ and $h$ fed to the second gate circuit 35 are here NAND gated, and a signal $i$ as indicated in FIG. 3(I) is produced as output. This output signal $i$ is fed to the first gate circuit 34 and is here NAND gated with the above mentioned signal $f$. In this gate circuit 34, the horizontal synchronizing pulses of the signals $f$ and $i$ are canceled, and only the vertical synchronizing pulses are taken out and sent out to an input terminal 37 as a transmitted and restored vertical synchronizing signal $PV'_D$ as indicated in FIG. 3(O).

Thus, through the output terminals 36 and 37, respectively, a horizontal synchronizing signal $PH'_D$ and a vertical synchronizing signal $PV'_D$ which have been transmitted and reproduced are led out and are supplied as deflection driving signals to the above mentioned horizontal and vertical deflection circuits 22 and 23. Here, the phase relationships of the restored horizontal and vertical synchronizing signals $PH'_D$ and $PV'_D$ are maintained the same respectively with those of the horizontal and vertical synchronizing signals $PH_D$ and $PV_D$.

While the above described signal waveforms indicated in FIGS. 3(F) through 3(I) relate to even number fields, the signal waveforms corresponding to FIGS. 3(F) through 3(I) and relating to odd number fields are as indicated in FIGS. 3(J) through 3(M).

The phase polarity of the signals indicated in the various charts of FIG. 3 are not limited to those of the examples thus indicated.

Figure 4:
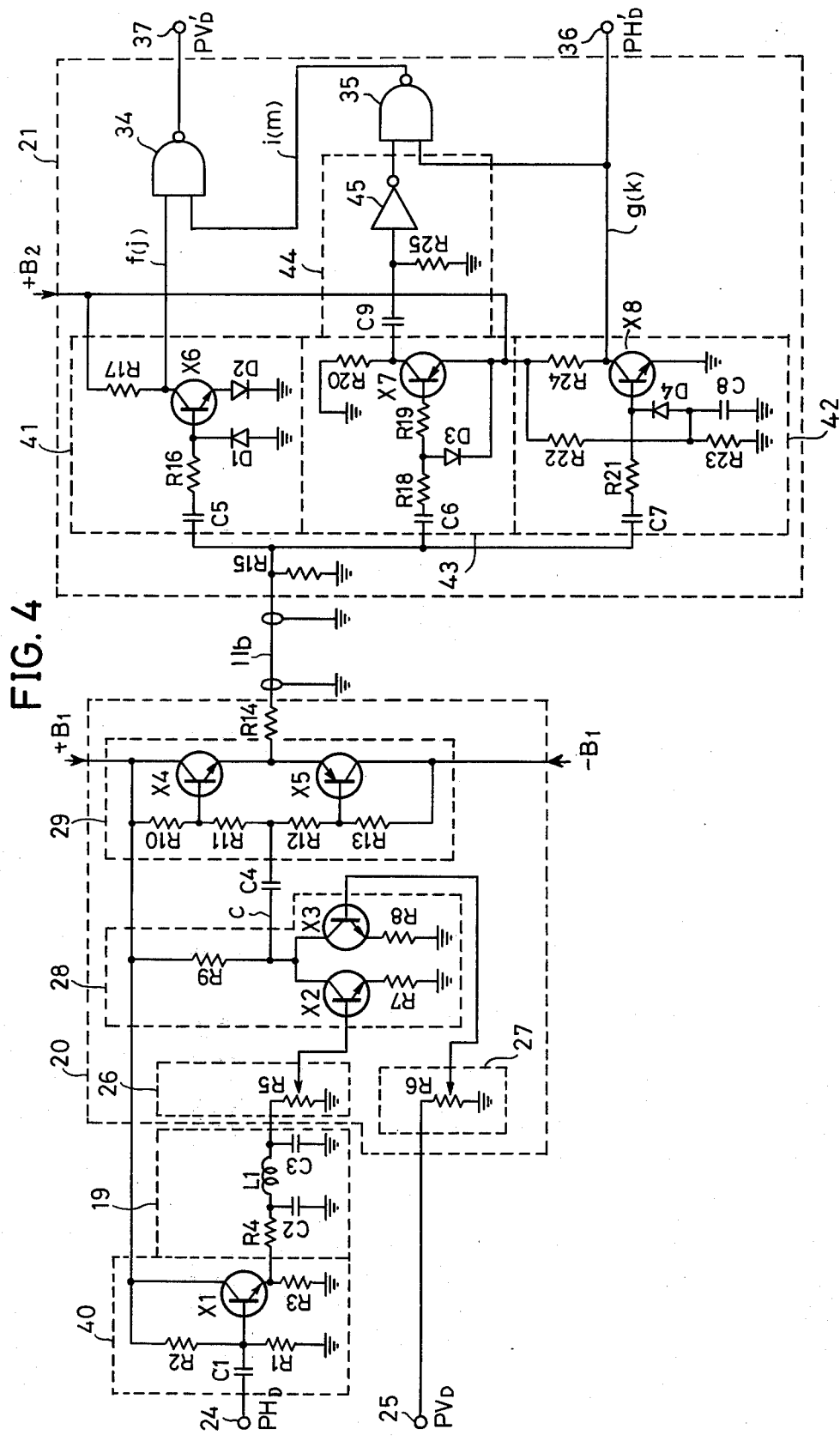
FIG. 4 is a circuit diagram of one embodiment of a specific electrical circuit of the system illustrated in FIG. 2.

Specific electrical circuits of the system parts illustrated by block diagram in FIG. 2 will now be described with respect to one embodiment thereof with reference to FIG. 4, in which block parts which are the same as corresponding parts in FIG. 2 are designated by like reference numerals.

The horizontal synchronizing signal $PH_D$ introduced through the terminal 24 passed through a buffer amplifier 40 comprising a capacitor C1, resistors R1, R2, and R3, and a transistor X1 and, after being delayed by the delay circuit 19 comprising a resistor R4, an inductance L1, and capacitances C2 and C3, is applied to the amplitude controller 26 comprising a variable resistor R5, where the amplitude thereof is controlled. On the other hand, the vertical synchronizing signal $PV_D$ introduced through the terminal 25 is applied to the amplitude controller 27 comprising a variable resistor R6, where the amplitude thereof is controlled.

The output signals of the amplitude controllers 26 and 27 are applied to the mixer 28 comprising resistors R7, R8, and R9 and transistors X2 and X3 and there mixed as described above. The waveform of the signal appearing at the resistor R9 of the mixer 28 is as indicated in FIG. 3(C). The amplitude of the horizontal synchronizing signal is determined by the amplitude of the input of the transistor X2 and the ratio of the resistances of the resistors R7 and R9, while the amplitude of the vertical synchronizing signal is determined by the amplitude of the input of the transistor X3 and the ratio of the resistances of the resistors R8 and R9. Therefore, if the values of the resistances of the resistors R7, R8, and R9 are kept constant, the mixed synchronizing signal $c$ of the waveform indicated in FIG. 3(C) can be readily obtained by adjusting the amplitudes of the input signals of the transistors X2 and X3 by means of the amplitude controllers 26 and 27.

The mixed synchronizing signal $c$ passes through a capacitor C4, through the output circuit 29 comprising resistors R10, R11, R12, and R13 and transistors X4 and X5, and further through a resistor R14 and is sent out through the coaxial cable 11b. The resistor R14 is used for the purpose of matching with the impedance of the coaxial cable 11b.

The mixed synchronizing signal $c$ thus transmitted through the coaxial cable 11b appears at the two ends of a terminal resistor R15 and is supplied to circuits 41, 42, and 43 for functioning as separating circuits and wave-shaping circuits. The separating and wave-shaping circuit 41 comprises a capacitor C5, resistors R16 and R17, a transistor X6, and diodes D1 and D2 and operates to separate and wave shape the signal component of the high voltage-level range designated by I of the signals of FIG. 3(C). More specifically, the transistor X6 is so biased by the diodes D1 and D2 as to operate with respect to only an input of a voltage above a certain predetermined voltage. Accordingly, the transistor X6 separates the signal component of the part of the voltage-level range I and, at the same time, effects wave shaping by the amplification effect thereof. The output signal $f$ of the circuit 41 is applied to the NAND gate 34. The resistor R16 functions additionally as a buffer resistor.

The separating and wave-shaping circuit 42 comprises capacitors C7 and C8, resistors R21, R22, R23, and R24, a transistor X8, and a diode D4 and operates to separate and wave shape the signal component of the medium voltage-level range designated by II of the signals of the signal $c$. More specifically, the transistor X8 is so biased by the resistors R22 and R23, the capacitor C8, and the diode D4 as to operate with respect to only an input of a voltage above a certain predetermined voltage. The values of the resistors R22 and R23 are so selected that this bias value will be lower than the value of the above mentioned bias applied to the transistor X6. Accordingly, the transistor X8 operates to separate the signal components of the parts of the voltage-level ranges I and II, but, as a result of the amplification effect thereof, the part of the voltage-level range I is clipped, and only the signal component of the part of the voltage-level range II is wave shaped and appears at the collector of the transistor X8. The output signal $g$ of the circuit 42 is sent as the reproduced horizontal synchronizing signal $PH'_D$ to the output terminal 36 and, at the same time, is supplied to the NAND gate 35. The resistor R21 has the addition function of a buffer resistor.

The separating and wave-shaping circuit 43 comprises a capacitor C6, resistors R18, R19 and R20, a transistor X7, and a diode D3 and operates to separate and wave shape the signal component of the low voltage-level range designated by III within the signal $c$. More specifically, the transistor X7 is so biased by the resistors R18 and R19 and the diode D3 as to operate with respect to only an input of a voltage below a certain predetermined voltage. Accordingly, the transistor X7 operates to separate the signal component of the part of the low voltage-level range III and, at the same time, to accomplish wave shaping by the amplification effect thereof. The waveform of the output signal of the circuit 43 is that resulting from a phase inversion of the waveform of the signal $h$ shown in FIG. 3(H). The resistor R18 functions additionally as a buffer resistor.

The output signal of the circuit 43 is phase inverted by a phase inverting circuit 44 comprising a capacitor C9, a resistor R25, and an inverter 45, and the ouput signal $h$ of this circuit 44 is supplied to the NAND gate 35. A signal $i$ is led out from the NAND gate 35 and is fed to the above mentioned NAND gate 34.

The above described separating and wave-shaping circuits 41, 42, and 43 correspond to the separating circuit 30 and the wave-shaping circuits 31, 32, and 33 of the system part illustrated in FIG. 2.

In the NAND gate 34, NAND gating of the above mentioned signals $f$ and $i$ is carried out, and from the output terminal 37 thereof, the reproduced, vertical synchronizing signal $PV'_D$ is led out.

The phase relationship between the reproduced horizontal and vertical synchronizing signals $PH'_D$ and $PV'_D$ appearing at the output terminals 36 and 37 is an accurate reproduction of the phase relationship between the horizontal and vertical synchronizing signals $PH_D$ and $PV_D$ arriving at the input terminals 24 and 25.

Further, this invention is not limited to these embodiments but various variations and modifications may be made without departing from the scope and spirit of the invention.

What is claimed is:

1. A synchronizing signal transmission system comprising:
    synchronizing signal generating means for generating a horizontal synchronizing signal and a vertical synchronizing signal;
    controlling means for controlling the amplitudes of the horizontal and vertical synchronizing signals respectively thereby to cause the controlled amplitude of the horizontal synchronizing signal to be greater than the controlled amplitude of the vertical synchronizing signal;
    mixing means for mixing the horizontal and vertical synchronizing signals controlled in amplitude by said controlling means and for producing a mixed synchronizing signal having a first voltage-level range corresponding to the pulse height of the amplitude-controlled vertical synchronizing signal in which range horizontal synchronizing pulses exist in only a period corresponding to the pulse width of the vertical synchronizing signal, a second voltage-level range corresponding to the difference between the pulse heights of the amplitude-controlled horizontal synchronizing signal and the amplitude-controlled vertical synchronizing signal under the first voltage-level range in which second voltage-level range the horizontal synchronizing pulses exist in all periods, and a third voltage-level range corresponding to the pulse height of the amplitude-controlled vertical synchronizing signal under the second voltage-level range in which third voltage-level range the horizontal synchronizing pulses do not exist in a period corresponding to the pulse width of the vertical synchronizing signal and exist in other periods;
    transmission means for transmitting the mixed synchronizing signal thus produced;
    first separation means for separating a signal including only the first voltage-level range from the mixed synchronizing signal thus transmitted;
    second separation means for separating a signal including only the second voltage-level range from the mixed synchronizing signal thus transmitted to derive the original horizontal synchronizing signal;
    third separation means for separating a signal including only the third voltage-level range from the mixed synchronizing signal thus transmitted; and
    processing means for processing the output signals of the first, second and third separation means to reproduce the original vertical synchronizing signal.

2. A synchronizing signal transmission system as claimed in claim 1 wherein said processing means comprises first gating means for NAND gating output signals of the second and third separation means, and second gating means for NAND gating output signals of said first separation means and said first gating means.

3. A synchronizing signal transmission system as claimed in claim 1 further comprising delay means for imparting a delay to the horizontal synchronizing signal from said synchronizing signal generating means corresponding to the magnitude of delay imparted thereto by said transmission means.

4. A synchronizing signal transmission system as claimed in claim 1 further comprising:
    horizontal and vertical deflection circuits supplied with the horizontal synchronizing signal derived by said second separation means and the vertical synchronizing signal reproduced by said processing means;
    a camera tube in which a scanning electron beam is deflected by outputs of the horizontal and vertical deflection circuits;
    means for transmitting camera picture signals of the camera tube;
    said synchronizing signal generating means further generating a synchronizing signal; and
    means for inserting into the transmitted camera picture signals the synchronizing signal generated by said synchronizing signal generating means.

* * * * *